(12) United States Patent
Erm

(10) Patent No.: US 10,059,509 B2
(45) Date of Patent: Aug. 28, 2018

(54) ASSEMBLY BOX FOR TRANSPORTATION

(71) Applicant: SYSPAC SUPPLY CHAIN, Seoul (KR)

(72) Inventor: Won Sun Erm, Seoul (KR)

(73) Assignee: SYSPAC SUPPLY CHAIN, Seoul (KR)

( * ) Notice: Subject to any disclaimer, the term of this patent is extended or adjusted under 35 U.S.C. 154(b) by 0 days.

(21) Appl. No.: 15/322,073

(22) PCT Filed: Aug. 5, 2014

(86) PCT No.: PCT/KR2014/007249
§ 371 (c)(1),
(2) Date: Dec. 23, 2016

(87) PCT Pub. No.: WO2015/199277
PCT Pub. Date: Dec. 30, 2015

(65) Prior Publication Data
US 2017/0137212 A1    May 18, 2017

(30) Foreign Application Priority Data
Jun. 26, 2014 (KR) .................. 10-2014-0078774

(51) Int. Cl.
*B65D 19/00* (2006.01)
*B65D 88/52* (2006.01)
(Continued)

(52) U.S. Cl.
CPC .......... *B65D 88/528* (2013.01); *B65D 88/12* (2013.01); *B65D 90/08* (2013.01); *G06K 19/0723* (2013.01)

(58) Field of Classification Search
CPC ...... B65D 88/528; B65D 88/12; B65D 90/08; G06K 19/0723
(Continued)

(56) References Cited

U.S. PATENT DOCUMENTS 3,517,849 A * 6/1970 Presnick .............. B65D 88/528
220/4.28
4,643,314 A * 2/1987 Kidd ..................... B65D 19/06
206/386
(Continued)

FOREIGN PATENT DOCUMENTS

CN    103470591    12/2013
CN    103470591    3/2015
(Continued)

OTHER PUBLICATIONS

PCT International Search Report, PCT/KR2014/007249, dated Mar. 23, 2015, 4 Pages.
(Continued)

*Primary Examiner* — Jacob K Ackun
*Assistant Examiner* — Jenine Pagan
(74) *Attorney, Agent, or Firm* — Fenwick & West LLP

(57) ABSTRACT

An assembly box for transportation is disclosed. The assembly box for transportation may comprise: a vertical corner frame arranged at a corner portion; first and second horizontal frames arranged perpendicularly, with the vertical corner frame interposed therebetween, so as to constitute upper and lower edge portions of a side wall; and corner brackets connecting the upper and lower ends of the vertical corner frames with ends of the first and second horizontal frames, respectively.

12 Claims, 17 Drawing Sheets

(51) Int. Cl.
 *B65D 88/12* (2006.01)
 *B65D 90/08* (2006.01)
 *G06K 19/07* (2006.01)

(58) Field of Classification Search
 USPC .... 206/386, 600; 220/4.01, 4.28, 4.33, 4.34, 220/6
 See application file for complete search history.

(56) References Cited

U.S. PATENT DOCUMENTS

| | | | | |
|---|---|---|---|---|
| 4,673,087 | A * | 6/1987 | Webb | B65D 11/1873 16/225 |
| 5,950,836 | A * | 9/1999 | Iwamoto | B65D 81/113 206/386 |
| 5,996,828 | A | 12/1999 | Cheyn | |
| 7,267,229 | B2 * | 9/2007 | Chen | B65D 19/06 206/386 |
| 7,784,615 | B2 * | 8/2010 | Stahl | B65D 21/045 206/511 |
| 8,376,168 | B2 * | 2/2013 | Fielden | B65D 19/06 206/386 |
| 8,807,366 | B2 * | 8/2014 | Erm | B65D 11/1853 217/12 R |
| 2004/0232145 | A1 * | 11/2004 | Antal, Sr. | B65D 11/1873 220/4.33 |
| 2007/0102315 | A1 | 5/2007 | Garcia De Alba | |
| 2008/0296194 | A1 | 12/2008 | Stahl | |
| 2011/0132801 | A1 * | 6/2011 | Elder | B65D 19/18 206/600 |
| 2015/0060321 | A1 | 3/2015 | Wang | |

FOREIGN PATENT DOCUMENTS

| | | |
|---|---|---|
| DE | 19850427 | 5/2000 |
| DE | 20-2008-007022 | 8/2008 |
| DE | 19850427 | 5/2015 |
| DE | 202008007022 | 8/2015 |
| EP | 0058003 | 8/1982 |
| EP | 0894727 | 2/1999 |
| EP | 2128045 | 12/2009 |
| JP | 2004026277 | 1/2004 |
| JP | 2005313978 | 11/2005 |
| JP | 2008273599 | 11/2008 |
| JP | 3167554 | 4/2011 |
| JP | 2014005029 | 1/2014 |
| KR | 10-2009-0039469 A | 4/2009 |
| KR | 10-1018337 B1 | 3/2011 |
| KR | 10-1099427 B1 | 12/2011 |
| KR | 20-0457124 Y1 | 12/2011 |
| KR | 10-1202774 B1 | 11/2012 |
| KR | 10-1239114 B1 | 3/2013 |

OTHER PUBLICATIONS

Supplementary European Search Report for European Patent Application No. EP 14895953.9, dated Feb. 9, 2018, 10 Pages.

* cited by examiner

ASSEMBLY BOX FOR TRANSPORTATION

TECHNICAL FIELD

The present invention relates to an assembly box for transportation and, more specifically, to an assembly box for transportation capable of facilitating the loading and unloading of articles into and from the assembly box, preventing damage such as rupture or the like of corner portions by disposing corner brackets in the corner portions, preventing distortion of the assembly box during an assembly process through the use of a structure in which brackets are fitted between frames, and providing a stable framework.

BACKGROUND

In general, a large-capacity packing box for transportation is used as a means for safely and conveniently transporting a large quantity of goods exchanged in a series of product distribution processes between a manufacturer, a merchant and a consumer and in an export/import process.

Depending on the features (the fragileness, the size, etc.) of goods accommodated therein, different kinds of packing boxes for transportation such as a paper box made of a corrugated board, a wood box made of wood, a plastic box made of plastic and a container box made of a steel plate are manufactured and selectively used. The packing boxes for transportation differ only in material from each other. The overall structures of the packing boxes have a simple rectangular box shape with an accommodation space formed therein.

In the meantime, when the packing boxes are recovered after moving the packing boxes which contain goods or when the packing boxes are stored in an empty state, the volume of the packing boxes remains unchanged even though the packing boxes are empty. Thus, a large space and an increased cost are required for storing and transporting the empty packing boxes.

In order to solve this problem, there has been developed and used an assembly box for transportation capable of maintaining a rectangular box shape as in the related art when moving the assembly box which contains goods and capable of minimizing the volume when recovering the assembly box or when storing the assembly box in an empty state. That is to say, the assembly box for transportation may be unfolded in a rectangular box shape when transporting goods and may be folded to have a minimized volume when recovering the assembly box.

In this connection, a "foldable container palette system" (Korean Utility Model Registration No. 20-0417505 may be referred to.

As illustrated in FIGS. 23 to 24, the foldable container palette system of the related art includes a box 10, a palette 20 and a lid 30. The box 10 may be folded to reduce the volume thereof during transportation and storage.

The box 10 includes several plastic panels 11 and 12, four corner folding members 13 and two central folding members 14 configured to interconnect the plastic panels 11 and 12 so that the plastic panels 11 and 12 can be folded in their connection portions and overlapped with each other. The plastic panels 11 and 12 are made of a resin so that the plastic panels 11 and 12 have a light weight and a superior workability.

Each of the corner folding members 13 is disposed in each corner and is configured to interconnect the edges of the plastic panels 11 and 12 adjoining each other. Each of the corner folding members 13 includes a pair of bracket portions 131 formed in a symmetrical shape with respect to each corner and a folding portion 133 configured to foldably interconnect the respective bracket portions 131. The bracket portions 131 and the folding portion 133 are formed into one piece.

In each of the bracket portions 131, there are formed insertion fixation channels 132 having a U-like cross-sectional shape and vertically extending so that the edges of the respective plastic panels 11 and 12 adjoining each other are inserted into and fixed to the insertion fixation channels 132. The bracket portions 131 make an angle of 90 degrees with each other when the box 10 is unfolded. In the bracket portions 131, stoppers 131a capable of making contact with each other are formed at the opposite side of the insertion fixation channels 132.

The folding portion 133 is made of a soft moldable resin so that the folding portion 133 can be easily deformed in order to foldably interconnect the bracket portions 131.

As illustrated in FIG. 25, each of the central folding members 14 includes a pair of bracket portions 141 and a folding portion 143 configured to foldably interconnect the respective bracket portions 141. The bracket portions 141 and the folding portion 143 are formed into one piece. In each of the bracket portions 141, there are formed insertion fixation channels 142 having a U-like cross-sectional shape and vertically extending so that the edges of the respective plastic panels 12 adjoining each other are inserted into and fixed to the insertion fixation channels 142. The bracket portions 141 make an angle of 180 degrees with each other when the box 10 is unfolded. For this purpose, stoppers 141a configured to make contact with each other at an angle of 180 degrees when the box 10 is unfolded are formed in the bracket portions 141. As with the folding portion 133, the folding portion 143 is made of a soft moldable resin.

In the case of the related art, the structurally weak folding members constitute the framework of the box and support the sidewall. Thus, the assembly box may be distorted by an external impact and may have a difficulty in performing a tracking management of the assembly box and a first-in and first-out management of the assembly box according to an incoming date. In particular, since the corner folding members are made of a soft material so that the corner folding members are folded with ease, damage such as rupture or the like may be frequently generated in the corner portions of the box.

SUMMARY

Embodiments of the present invention provide an assembly box for transportation capable of preventing damage of corner portions and maintaining a stable framework.

In accordance with an aspect of the present invention, there is provided an assembly box for transportation, including: vertical corner frames disposed in corner portions; first horizontal frames and second horizontal frames configured to define upper and lower edge portions of a sidewall and disposed in an orthogonal relationship with the vertical corner frames interposed between the first horizontal frames and the second horizontal frames; corner brackets configured to interconnect upper and lower ends of the vertical corner frames and end portions of the first horizontal frames and the second horizontal frames.

The assembly box may further include a cover configured to cover upper end portions of the vertical corner frames, the first horizontal frames and the second horizontal frames; a palette fitted and coupled to lower end portions of the vertical corner frames, the first horizontal frames and the second horizontal frames; and a base disposed on the palette and provided with base brackets in the corner portions.

Further, each of the corner brackets may include a first bracket piece coupled to end portions of each of the vertical corner frames and each of the first horizontal frames and provided with a first rail groove formed in one side portion thereof; a second bracket piece coupled to end portions of each of the vertical corner frames and each of the second horizontal frames and provided with a second rail groove formed in one side portion thereof; a first guide fitted to the first rail groove at one end thereof and provided with a female rail at the other end thereof; and a second guide fitted to the second rail groove at one end thereof and provided with a male rail at the other end thereof, the male rail slidingly fitted to the female rail.

The assembly box may further include first vertical reinforcing frames and second vertical reinforcing frames disposed on mutually-facing sidewalls in a spaced-apart relationship; and reinforcing brackets configured to connect the first vertical reinforcing frames and the second vertical reinforcing frames to the first horizontal frames.

The assembly box may further include first vertical rail frames and second vertical rail frames slidably installed in the first vertical reinforcing frames and the second vertical reinforcing frames, respectively; and horizontal reinforcing frames configured to orthogonally interconnect the first vertical rail frames and the second vertical rail frames.

The assembly box may further include vertical folding frames installed on mutually-facing sidewalls so that the sidewalls can be folded; and folding brackets configured to connect the vertical folding frames to the second horizontal frames.

Each of the first vertical reinforcing frames and the second vertical reinforcing frames may include a first rail member provided at one end with a first insertion channel portion into which a neighboring sidewall is inserted, provided at the other end with a female rail portion, and provided at the center with a first fastening groove portion to which a screw is fastened; and a second rail member provided at one end with a male rail portion to which the female rail portion is slidingly fitted, provided at the other end with a second insertion channel portion into which a neighboring sidewall is inserted, and provided at the center with a second fastening groove portion to which a screw is fastened.

The cover may include a cover portion in which longitudinal reinforcing ribs and transverse reinforcing ribs are formed to intersect each other between guides which define an outer edge of the cover; and cover groove portions formed on the cover portion in a depressed shape.

The palette may include a support portion including guides protruding so as to define an outer edge of the support portion, longitudinal reinforcing ribs integrally formed with the guides and configured to provide a plurality of ribs extending in a longitudinal direction, and transverse reinforcing ribs configured to provide a plurality of ribs extending in a transverse direction; coupling portions configured to protrude downward from the support portion; and accommodation portions formed in an upper portion of the support portion in a depressed shape.

Further, seating grooves and seating projections configured to fix other stacked brackets may be formed on upper and lower surfaces of the corner brackets.

Further, fixing grooves and fixing projections configured to fix other stacked brackets may be formed in the first bracket piece and the second bracket piece.

The assembly box may further include a handle installed in the sidewall, and the handle may include a grip portion configured to be held by a user and an RFID chip configured to provide product information.

The assembly box may further include a mark plate mounted to the sidewall through a removable mounting portion, and the removable mounting portion may include a magnet piece including asymmetrical engagement claws provided in opposite side portions of the magnetic piece so that the magnetic piece is fixed in a mounting hole of the sidewall; and an iron band provided in the mark plate so that the iron band is removably mounted to the magnetic piece.

Effects of the Invention

The embodiments of the present invention have an advantage in that it is possible to minimize the thickness of the box when the box is folded and it is easy to perform a work of loading and unloading goods into and from the box.

Furthermore, the embodiments of the present invention have an advantage in that, by providing the corner brackets in the corner portions, it is possible to prevent damage such as rupture or the like of the corner portions.

Furthermore, the embodiments of the present invention have an advantage in that it is possible to prevent distortion of the assembly box during an assembly process and to provide a stable framework through the use of a structure in which the brackets are fitted between the frames.

Furthermore, the embodiments of the present invention have an advantage in that, by installing an RFID chip, which provides product information, in the handle of the assembly box, it is possible to easily perform a tracking management of the assembly box and a first-in and first-out management of the assembly box according to an incoming date.

Furthermore, the embodiments of the present invention have an advantage in that, by removably installing the mark plate in the sidewall of the assembly box, it is possible to easily replace the information on the goods accommodated within the assembly box and to remove the mark plate during the cleaning process of the assembly box, thereby preventing damage and contamination of the mark plate.

DETAILED DESCRIPTION

Figure 1:
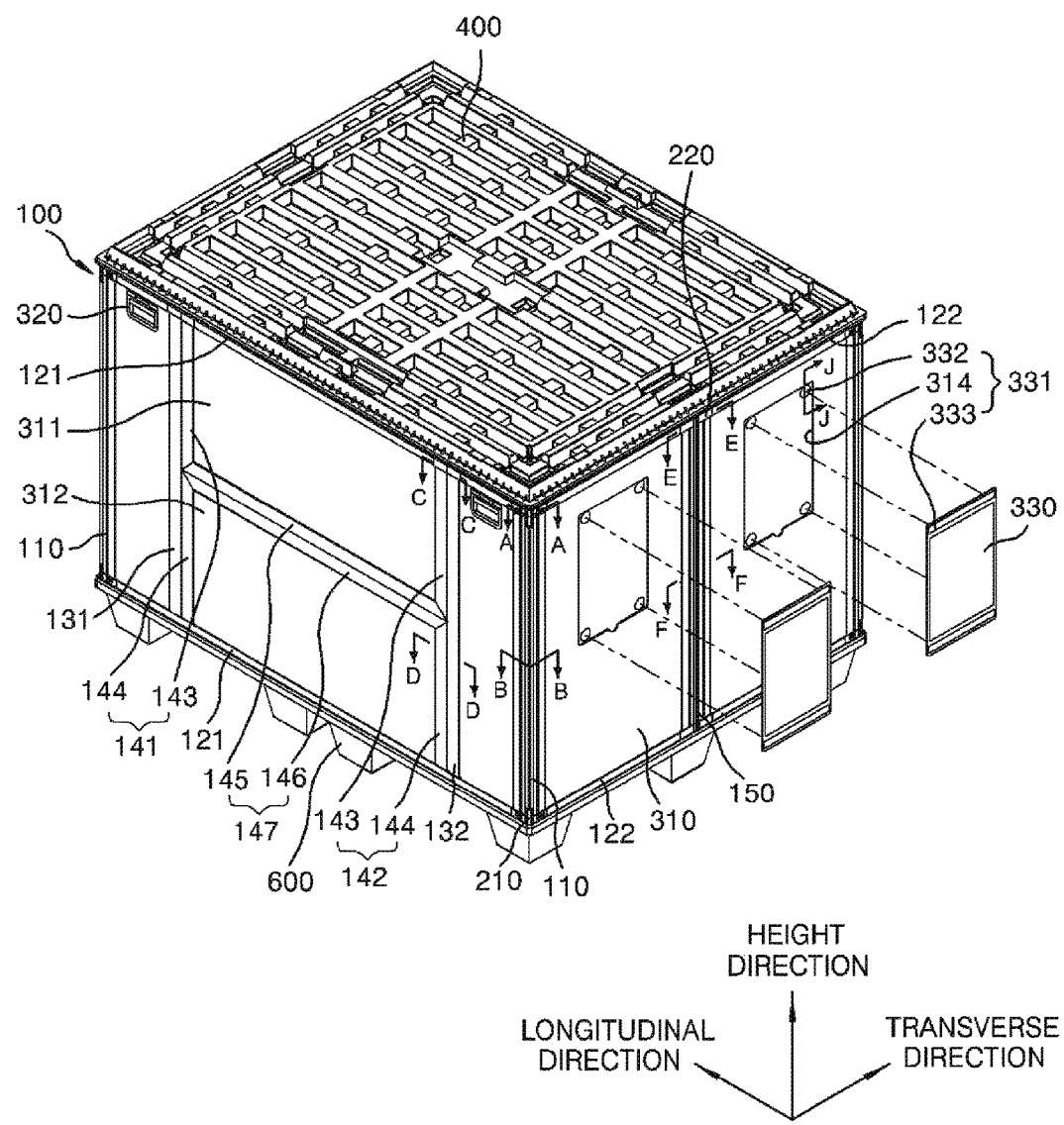
FIG. 1 is a perspective view illustrating an assembly box for transportation according to one embodiment of the present invention.
Figure 2:
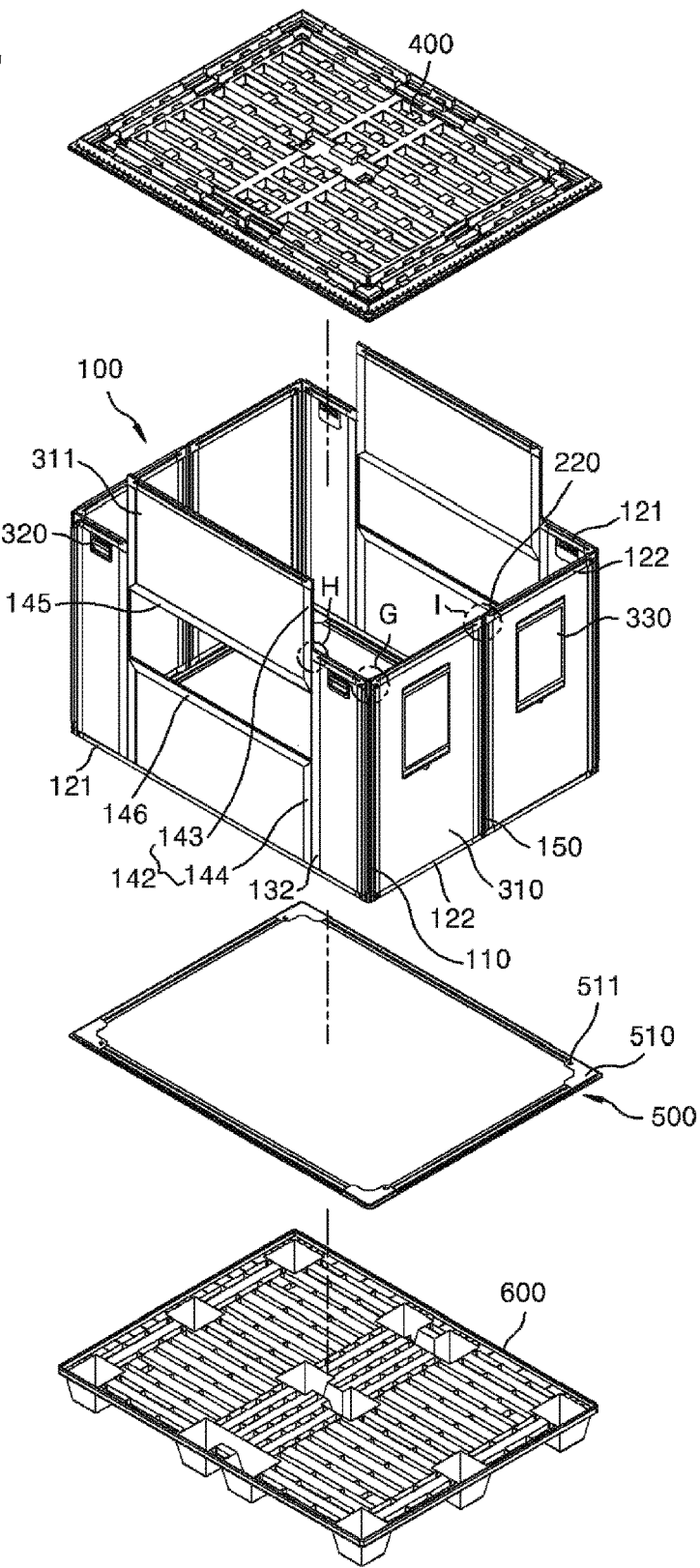
FIG. 2 is an exploded perspective view illustrating the assembly box for transportation according to one embodiment of the present invention.

FIG. 1 is a perspective view illustrating an assembly box for transportation according to one embodiment of the present invention. FIG. 2 is an exploded perspective view illustrating the assembly box for transportation according to one embodiment of the present invention.

As illustrated in FIGS. 1 and 2, the assembly box for transportation according to one embodiment of the present invention includes a main body 100, which includes sidewalls, frames and brackets, a cover 400 configured to cover an upper end of the main body 100, and a base 500 and a palette 600 configured to constitute a bottom portion of the main body 100.

Specifically, the sidewalls 310 of the main body 100 may be made of a synthetic resin having a light weight and a superior workability, for example, a plurality of plastic panels. The sidewalls 310 may be assembled between the frames. In this regard, the frames may include vertical corner frames 110, first horizontal frames 121, second horizontal frames 122, first vertical reinforcing frames 131, second vertical reinforcing frames 132, first vertical rail frames 141, second vertical rail frames 142, horizontal reinforcing frames 147 and vertical folding frames 150. The vertical corner frames 110

The vertical corner frames 110 are four frames vertically disposed in the corner portions of the assembly box. The vertical corner frames 110 may serve as a framework for supporting the sidewalls 310 of the assembly box. The sidewalls 310 of the main body 100 are assembled with the four vertical corner frames 110. The upper and lower end portions of the vertical corner frames 110 may be connected to the first horizontal frames 121 and the second horizontal frames 122 through corner brackets 210.

The first horizontal frames 121 and the second horizontal frames 122 are frames disposed in the upper and lower edge portions of the main body 100 and may be orthogonally connected to the vertical corner frames 110 interposed therebetween. For example, the first horizontal frames 121 may be defined as longitudinal horizontal frames of the main body 100 connected to one side of the vertical corner frames 110. The second horizontal frames 122 may be defined as transverse horizontal frames of the main body 100 connected to the other side of the vertical corner frames 110. In the present embodiment, the first horizontal frames 121 may be formed of at least four frames disposed in the longitudinal upper and lower edge portions of the main body 100. The second horizontal frames 122 may be formed of at least four frames disposed in the transverse upper and lower edge portions of the main body 100.

In particular, the first vertical reinforcing frames 131 and the second vertical reinforcing frames 132 may be connected to the first horizontal frames 121 through reinforcing brackets 230. The vertical folding frames 150 may be connected to the second horizontal frames 122 through folding brackets 220.

The first vertical reinforcing frames 131 and the second vertical reinforcing frames 132 may be formed of a pair of frames horizontally spaced apart on the mutually-facing sidewall 310, more specifically on the sidewall 310 positioned at the longitudinal side on the basis of the vertical corner frames 110. The first vertical rail frames 141 and the second vertical rail frames 142 may be slidably installed in the first vertical reinforcing frames 131 and the second vertical reinforcing frames 132, respectively.

The first vertical rail frames 141 and the second vertical rail frames 142 may include upper vertical rail members 143 and lower vertical rail members 144. In this regard, the upper vertical rail members 143 may be assembled with the upper side of the first vertical reinforcing frames 131 and the second vertical reinforcing frames 132 so that they can be slidingly moved in the height direction of the main body 100. The lower vertical rail members 144 may be slidably coupled to the lower side of the first vertical reinforcing frames 131 and the second vertical reinforcing frames 132 and may then be fixed to the first horizontal frames 121 positioned in the longitudinal lower edge portions, by fixing members such as a bolts or the like.

In this regard, the upper vertical rail members 143, the lower vertical rail members 144 and the horizontal reinforcing frames 147 may constitute the edge portions of opening/closing sidewalls 311 and fixed sidewalls 312. The horizontal reinforcing frames 147 may include upper horizontal reinforcing frames 145 configured to provide the edge portions of the opening/closing sidewalls 311 together with the upper vertical rail members 143 and lower horizontal reinforcing frames 146 configured to provide the edge portions of the opening/closing sidewalls 311 together with the lower vertical rail members 144.

As the upper vertical rail members 143 are slid at the upper side of the first vertical reinforcing frames 131 and the second vertical reinforcing frames 132 in this way, the opening/closing sidewalls 311 may be slidingly moved in the up-down direction in the sidewalls 310 of the main body 100. As a consequence, the opening/closing sidewalls 311 may easily open and close some portions of the sidewalls 310 of the main body 100.

The vertical folding frames 150 may be vertically installed on the mutually-facing sidewalls 310, more specifically on the sidewalls 310 positioned at the transverse side on the basis of the vertical corner frames 110. The opposite ends of the vertical folding frames 150 may be connected to the second horizontal frames 122 through the folding brackets 220. Since the vertical folding frames 150 are formed of a structure capable of being folded in the width direction, the sidewalls 310 of the main body 100 may be folded with respect to the vertical folding frames 150.

The brackets of the main body 100 are connection members for interconnecting the frames and may include corner brackets 210, reinforcing brackets 230 and folding brackets 220. In this regard, the corner brackets 210 may interconnect the end portions of the vertical corner frames 110 and the end portions of the first horizontal frames 121 and the second horizontal frames 122. The reinforcing brackets 230 may connect the first vertical reinforcing frames 131 and the second vertical reinforcing frames 132 to the first horizontal frames 121. The folding brackets 220 may connect the vertical folding frames 150 to the second horizontal frames 122.

The cover 400 has a cap structure configured to cover the upper portion of the main body 100 and may be formed in a rectangular plate shape as a whole. The cover 400 may surround and protect the upper end portions of the vertical corner frames 110, the first horizontal frames 121 and the second horizontal frames 122. The cover 400 may be provided with rib structures for enhancing the strength of the cover 400.

The base 500 may be disposed at the upper side of the palette 600 and may provide a bottom surface of the main body 100. Base brackets 510 may be provided in the corner portions of the base 500. Seating grooves 511 and seating projections (not shown) may be formed on the upper and lower surfaces of the base brackets 510. The seating grooves 511 and the seating projections may fix different brackets stacked one above the other.

For example, when different bases 500 are stacked one above the other, the seating grooves 511 and the seating projections of the stacked base brackets 510 may be fitted and fixed to each other. Furthermore, when the folded main body 100 and the base 500 are stacked one above the other, the seating grooves 511 and the seating projections of the base brackets 510 may be fitted and fixed to fixing grooves 204 and fixing grooves 203 of the corner brackets 210 which will be described later.

The palette 600 is a structure for supporting the base 500 and may provide a bottom plate of the assembly box. The lower end portions of the vertical corner frames 110, the first horizontal frames 121 and the second horizontal frames 122 may be fitted to and assembled with the edge portion of the palette 600.

Hereinafter, the configuration of the main body 100 according to one embodiment of the present invention will be described in more detail with reference to the accompanying drawings.

Figure 3:
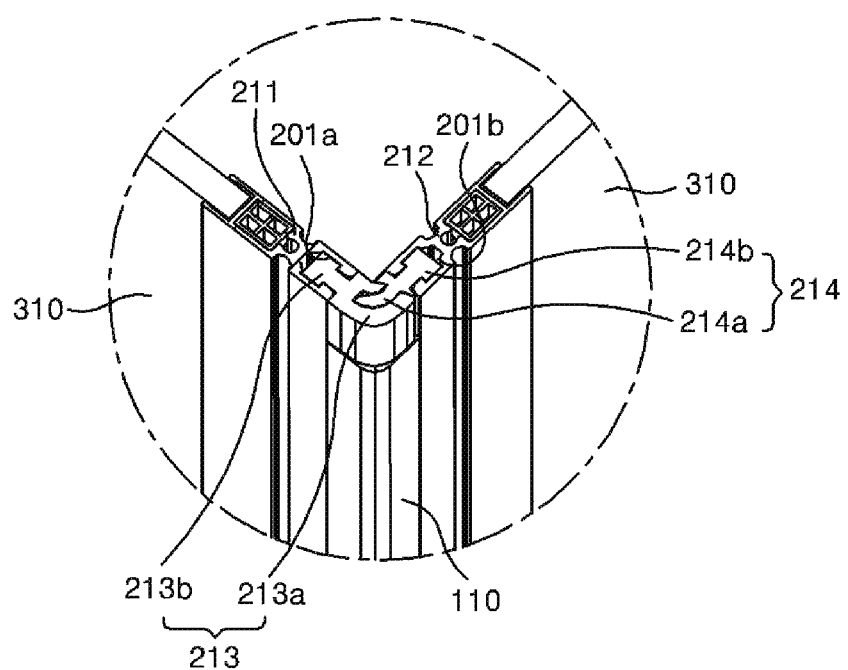
FIG. 3 is a partially cutaway perspective view of a portion indicated by line "A-A" in FIG. 1.
Figure 9:
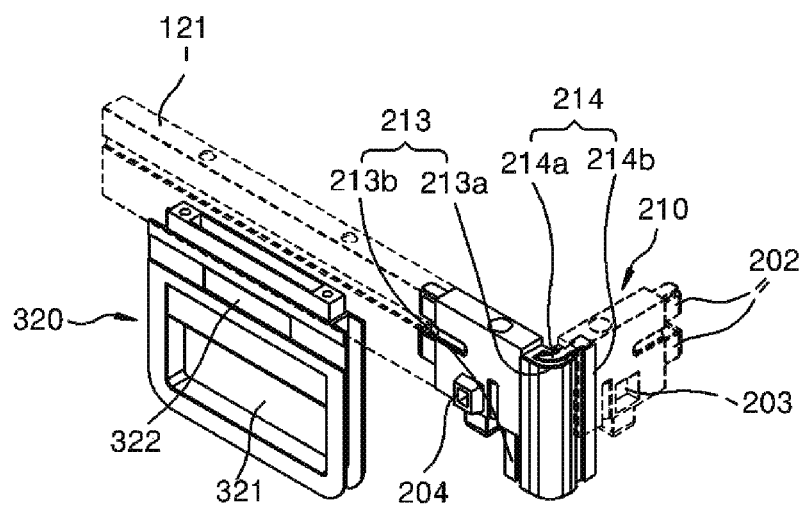
FIG. 9 is an enlarged perspective view of a portion indicated by "G" in FIG. 2.

FIG. 3 is a partially cutaway perspective view of a portion indicated by line "A-A" in FIG. 1. FIG. 9 is an enlarged perspective view of a portion indicated by "G" in FIG. 2.

As illustrated in FIGS. 3 and 9, each of the corner brackets 210 may include a first bracket piece 211, a second bracket piece 212, a first guide 213 and a second guide 214. Each of the corner brackets 210 may interconnect the end portion of each of the vertical corner frames 110 and the end portions of each of the first horizontal frames 121 and each of the second horizontal frames 122.

The first bracket piece 211 may be fitted to and assembled with the end portion of each of the vertical corner frames 110 and the end portion of each of the first horizontal frames 121 through coupling projections 202. A first rail groove 201a, to which the first guide 213 is slidingly coupled, may be formed is one side portion of the first bracket piece 211. The second bracket piece 212 may be fitted to and assembled with the end portion of each of the vertical corner frames 110 and the end portion of each of the second horizontal frames 122 through coupling projections 202. A second rail groove 201b, to which the second guide 214 is slidingly coupled, may be formed is one side portion of the second bracket piece 212.

In this case, a fixing groove 203 and a fixing projection 204 may be formed in the first bracket piece 211 and the second bracket piece 212. The fixing groove 203 and the fixing projection 204 constitute a groove/projection structure for fixing different brackets stacked one above the other. When different corner brackets 210 are stacked one above the other, the fixing groove 203 and the fixing projection 204 of the stacked corner brackets 210 may be fixed and fixed to each other. Furthermore, when the corner brackets 210 of the folded main body 100 and the base 500 are stacked one above the other, the fixing projections 204 and the fixing grooves 203 of the corner brackets 210 and the seating grooves 511 and the seating projections may be fitted and fixed to each other.

The first guide 213 and the second guide 214 may be positioned in each of the corner portions of the main body 100 and may foldably interconnect the first bracket piece 211 and the second bracket piece 212. For this purpose, a first rail portion 213b fitted to the first rail groove 201a and a female rail 213a fitted to a male rail 214a to be described later may be provided in the opposite end portions of the first guide 213. A second rail portion 214b fitted to the second rail groove 201b and a male rail 214a slidingly coupled to the female rail 213a may be provided in the opposite end portions of the second guide 214.

Thus, if the main body 100 is folded on the basis of the vertical folding frames 150, the female rail 213a of the first guide 213 and the male rail 214a of the second guide 214 are slidingly moved in the folding direction of the vertical corner frames 110 so that the main body 100 can be smoothly folded.

In the meantime, a handle 320 may be installed in the portion of each of the sidewalls 310 which adjoins the corner brackets 210. The handle 320 may include a groove-shaped grip portion 321 configured to be easily held by a user and an RFID chip 322 configured to provide product information on a tracking management of the assembly box and a first-in and first-out management of the assembly box according to an incoming date.

Figure 4:
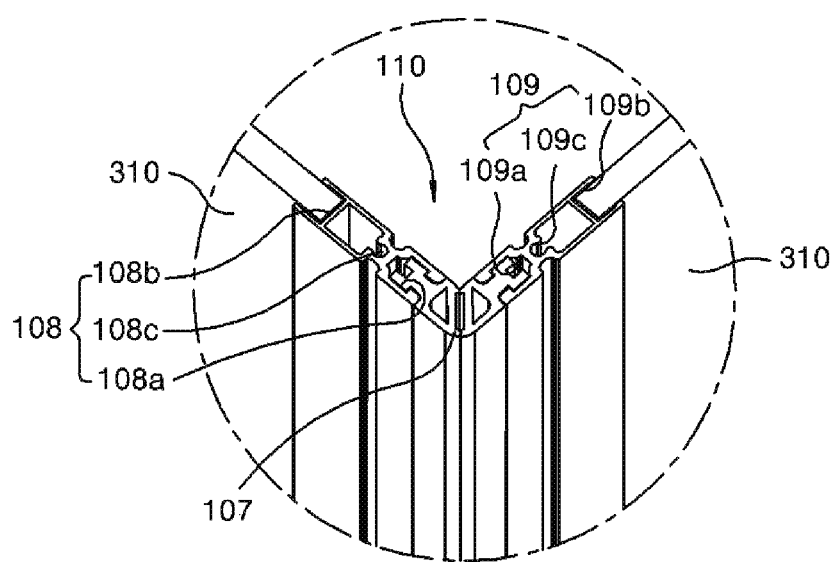
FIG. 4 is a partially cutaway perspective view of a portion indicated by line "B-B" in FIG. 1.

FIG. 4 is a partially cutaway perspective view of a portion indicated by line "B-B" in FIG. 1.

As illustrated in FIG. 4, each of the vertical corner frames 110 may include a hinge member 107, a first bracket member 108 and a second bracket member 109.

The hinge member 107 is formed of a foldable soft member so that, when the main body 100 is folded inward of the main body 100 on the basis of each of the vertical folding frames 150, each of the vertical corner frames 110 is folded outward of the main body 100.

In order to interconnect one end of the hinge member 107 and the neighboring sidewall 310, a first hinge coupling portion 108a, to which one end of the hinge member 107 is coupled, may be formed at one end of the first bracket member 108. A first fixing channel portion 108b, into which the neighboring sidewall 310 is inserted, may be formed at the other end of the first bracket member 108. A first thread groove portion 108c, to which a screw is fastened, may be formed at the center of the first bracket member 108.

Furthermore, in order to interconnect one end of the hinge member 107 and the neighboring sidewall 310, a second hinge coupling portion 109a, to which one end of the hinge member 107 is coupled, may be formed at one end of the second bracket member 109. A second fixing channel portion 109b, into which the neighboring sidewall 310 is inserted, may be formed at the other end of the second bracket member 109. A second thread groove portion 109c, to which a screw is fastened, may be formed at the center of the second bracket member 109.

Figure 5:
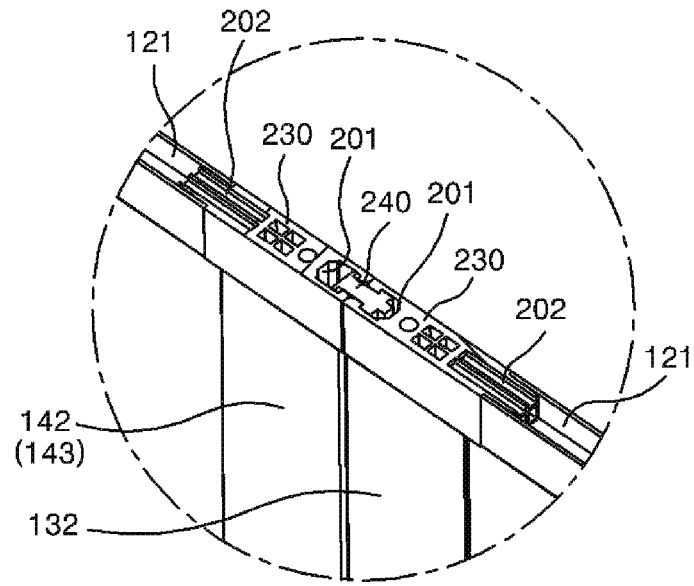
FIG. 5 is a partially cutaway perspective view of a portion indicated by line "C-C" in FIG. 1.
Figure 10:
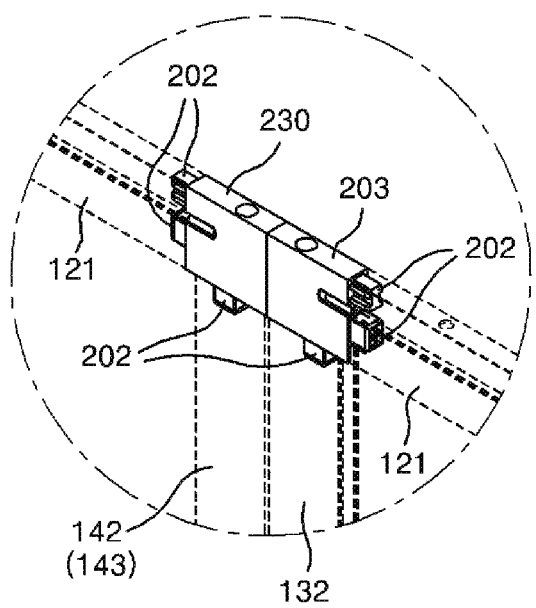
FIG. 10 is an enlarged perspective view of a portion indicated by "H" in FIG. 2.

FIG. 5 is a partially cutaway perspective view of a portion indicated by line "C-C" in FIG. 1. FIG. 10 is an enlarged perspective view of a portion indicated by "H" in FIG. 2.

As illustrated in FIGS. 5 and 10, each of the reinforcing brackets 230 may connect the end portions of each of the first vertical reinforcing frames 131 and each of the second vertical reinforcing frames 132 to each of the first horizontal frames 121 and may connect the end portions of each of the first vertical rail frames 141 and each of the second vertical rail frames 142 to each of the first horizontal frames 121.

For this purpose, coupling projections 202 inserted into the end portion of each of the first horizontal frames 121 and the end portions of each of the first vertical reinforcing frames 131 and each of the second vertical reinforcing frames 132 or inserted into the end portions of each of the first vertical rail frames 141 and each of the second vertical rail frames 142 may be provided in each of the reinforcing brackets 230. Furthermore, a rail groove 201, to which a connection guide 240 is slidably fitted, may be formed in each of the reinforcing brackets 230 in order to interconnect different reinforcing brackets 230.

In the present embodiment, a pair of the reinforcing brackets 230 may be coupled to each other by the connection guide 240. In this case, the opposite end portions of the connection guide 240 may be slidingly coupled to the rail grooves 201 of the reinforcing brackets 230.

Figure 6:
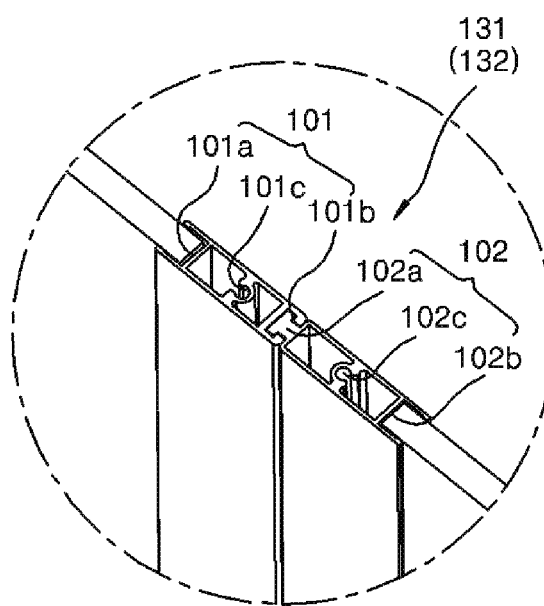
FIG. 6 is a partially cutaway perspective view of a portion indicated by line "D-D" in FIG. 1.

FIG. 6 is a partially cutaway perspective view of a portion indicated by line "D-D" in FIG. 1.

As illustrated in FIG. 6, each of the first vertical reinforcing frames 131 and the second vertical reinforcing frames 132 may include a first rail member 101 and a second rail member 102 which are configured to interconnect the adjoining sidewalls 310.

In this regard, a first insertion channel portion 101a, into which the neighboring sidewall 310 is inserted, may be formed at one end of the first rail member 101. A female rail portion 101b may be provided at the other end of the first rail member 101. A first fastening groove portion 101c, to which a screw is fastened, may be formed at the center of the first rail member 101.

Furthermore, a male rail portion 102a, to which the female rail portion 101b is slidingly fitted, may be provided at one end of the second rail member 102. A second insertion channel portion 102b, into which the neighboring sidewall 310 is inserted, may be formed at the other end of the second rail member 102. A second fastening groove portion 102c, to which a screw is fastened, may be formed at the center of the second rail member 102.

Figure 7:
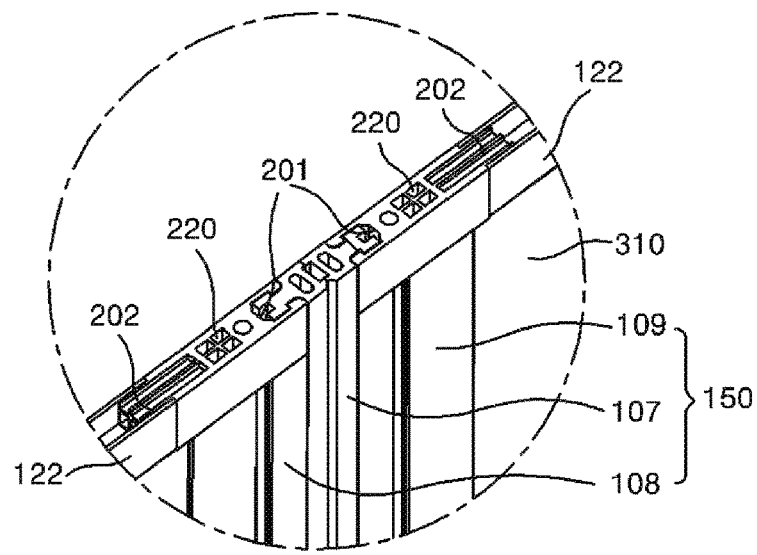
FIG. 7 is a partially cutaway perspective view of a portion indicated by line "E-E" in FIG. 1.
Figure 11:
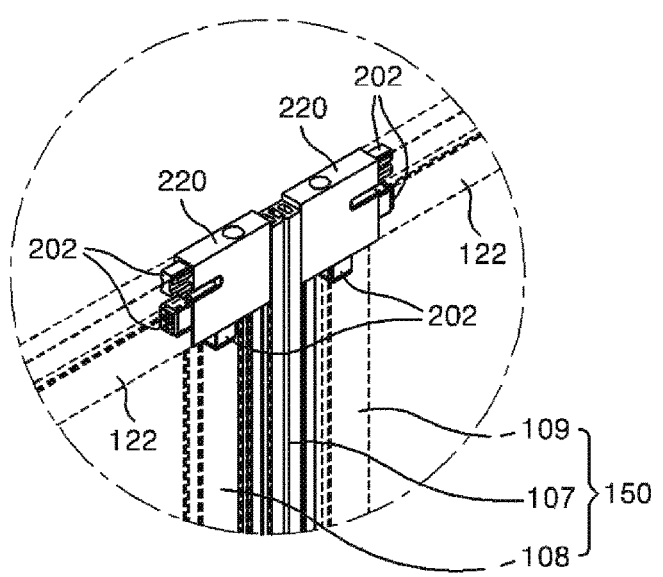
FIG. 11 is an enlarged perspective view of a portion indicated by "I" in FIG. 2.

FIG. 7 is a partially cutaway perspective view of a portion indicated by line "E-E" in FIG. 1. FIG. 11 is an enlarged perspective view of a portion indicated by "I" in FIG. 2.

As illustrated in FIGS. 7 and 11, each of the folding brackets 220 is a bracket for folding the main body 100 and may connect each of the vertical folding frames 150 to each of the second horizontal frames 122.

Coupling projections 202 inserted into the end portions of each of the second horizontal frames 122 and the end portion of each of the vertical folding frames 150 and a rail groove 201, to which the hinge member 107 of each of the vertical folding frames 150 is fitted, may be formed in each of the folding brackets 220.

Figure 8:
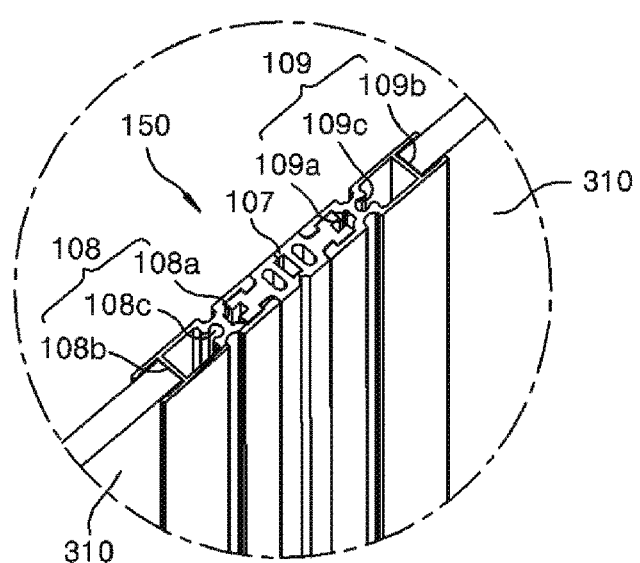
FIG. 8 is a partially cutaway perspective view of a portion indicated by line "F-F" in FIG. 1.

FIG. 8 is a partially cutaway perspective view of a portion indicated by line "F-F" in FIG. 1.

As illustrated in FIG. 8, each of the vertical folding frames 150 may include a hinge member 107, a first bracket member 108 and a second bracket member 109.

The hinge member 107 may be formed of a foldable soft member so that each of the vertical folding frames 150 can be folded inward of the main body 100.

In order to interconnect one end of the hinge member 107 and the neighboring sidewall 310, a first hinge coupling portion 108a, to which one end of the hinge member 107 is coupled, may be formed at one end of the first bracket member 108. A first fixing channel portion 108b, into which the neighboring sidewall 310 is inserted, may be formed at the other end of the first bracket member 108. A first thread groove portion 108c, to which a screw is fastened, may be formed at the center of the first bracket member 108.

Furthermore, in order to interconnect one end of the hinge member 107 and the neighboring sidewall 310, a second hinge coupling portion 109a, to which one end of the hinge member 107 is coupled, may be formed at one end of the second bracket member 109. A second fixing channel portion 109b, into which the neighboring sidewall 310 is inserted, may be formed at the other end of the second bracket member 109. A second thread groove portion 109c, to which a screw is fastened, may be formed at the center of the second bracket member 109.

Figure 12:
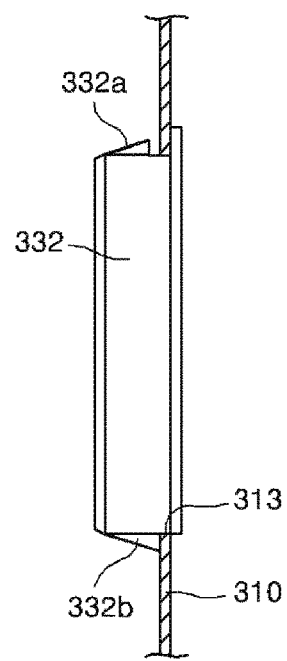
FIG. 12 is a partially cutaway perspective view of a portion indicated by line "J-J" in FIG. 1.

FIG. 12 is a partially cutaway perspective view of a portion indicated by line "J-J" in FIG. 1.

As illustrated in FIGS. 1 and 12, a mark plate 330 may be mounted to the sidewall 310 of the main body 100 through a removable mounting portion 331. The removable mounting portion 331 may include magnet pieces 332, iron bands 333 and a removal groove 314.

The magnet pieces 332 may hold the iron bands 333 of the mark plate 330 using a magnetic force and may be fixed to a mounting hole 313 of the sidewall 310 through an engagement claw. In this regard, the engagement claw may include a first engagement claw 332a and a second engagement claw 332b, both of which have a wedge shape.

For example, the second engagement claw 332b is formed in a wedge shape so as to have a thickness larger than the thickness of the first engagement claw 332a. Thus, a user may first insert the second engagement claw 332b into the mounting hole 313. In this state, the user may insert the first engagement claw 332a into the mounting hole 313. This enables the user to easily mount the magnet pieces 332 to the mounting hole 313.

The iron bands 333 may be provided in the mark plate 330 so that the iron bands 333 can be removably mounted to the magnet pieces 332. In the present embodiment, the iron bands 333 may be positioned in the upper and lower portions of the mark plate 330. In this case, the magnet pieces 332 may also be positioned in the portions of the removal groove 314 of the sidewall 310 corresponding to the upper and lower portions of the mark plate 330.

The removal groove 314 is a groove to which the mark plate 330 is removably mounted. The removal groove 314 may be formed to have the same size as the mark plate 330. The magnet pieces 332 may be positioned in the upper and lower sides of the removal groove 314.

Figure 13:
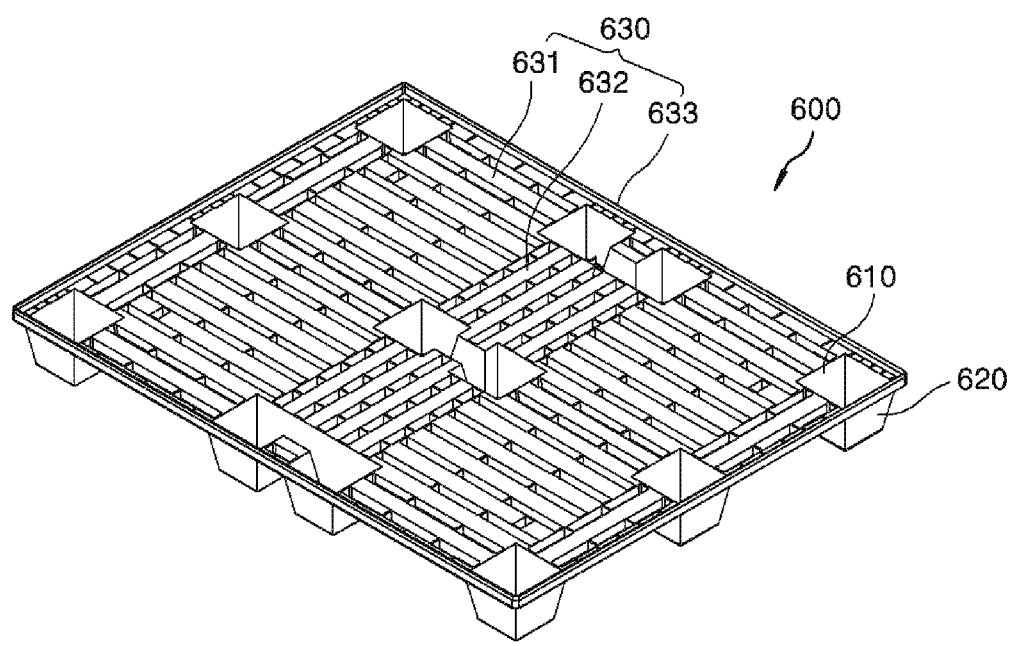
FIG. 13 is an enlarged perspective view of an upper portion of a palette according to one embodiment of the present invention.
Figure 14:
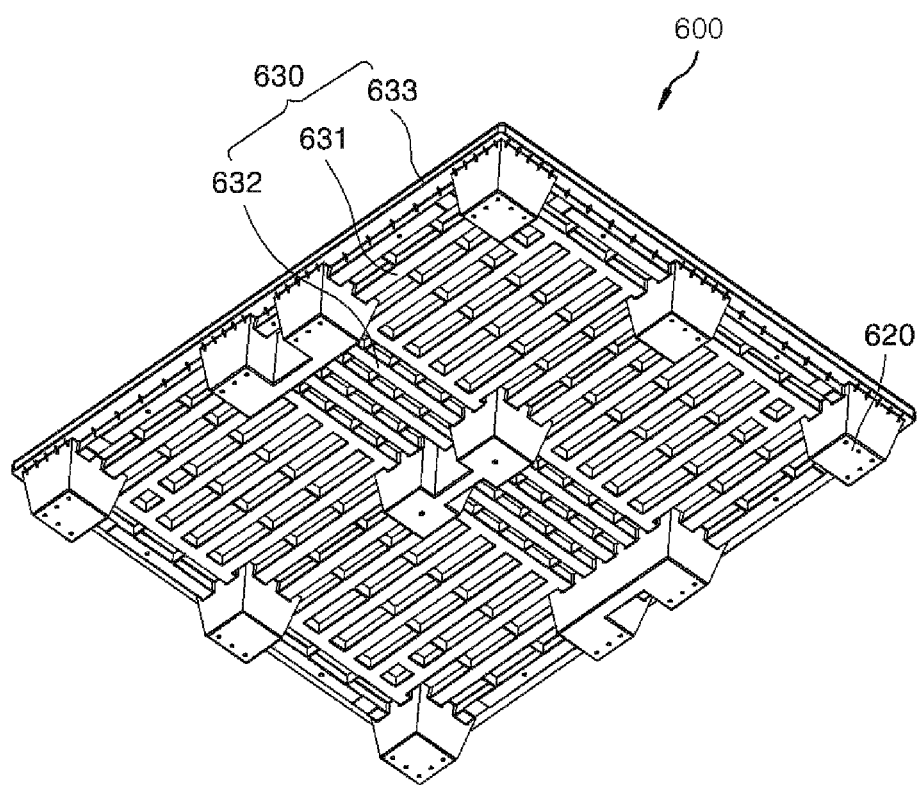
FIG. 14 is an enlarged perspective view of a lower portion of a palette according to one embodiment of the present invention.
Figure 15:
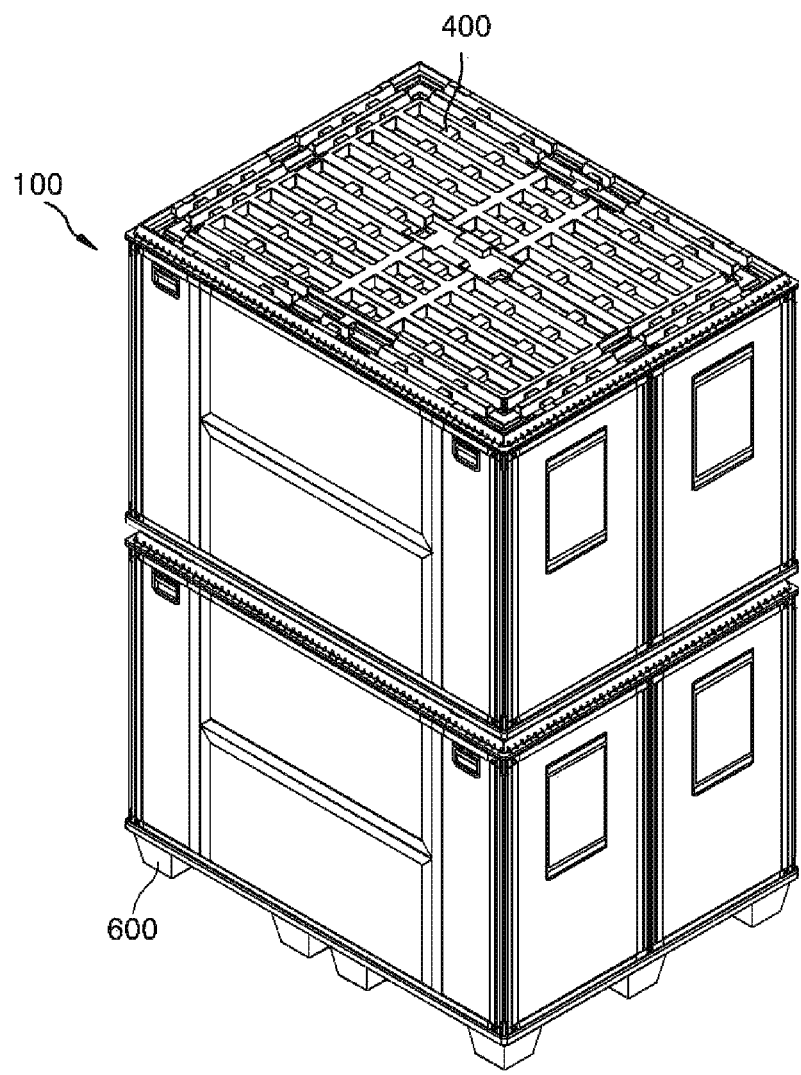
FIG. 15 is a perspective view illustrating a stacked state of the assembly boxes for transportation according to one embodiment of the present invention.

FIG. 13 is an enlarged perspective view of an upper portion of the palette according to one embodiment of the present invention. FIG. 14 is an enlarged perspective view of a lower portion of the palette according to one embodiment of the present invention. FIG. 15 is a perspective view illustrating a stacked state of the assembly boxes for transportation according to one embodiment of the present invention.

As illustrated in FIGS. 13 to 15, the palette 600 may include a support portion 630, coupling portions 620 and accommodation portions 610 and may serve to support the lower portion of the assembly box for transportation.

The support portion 630 may prevent deflection and may minimize shocks through load distribution by disposing longitudinal reinforcing ribs 631 and transverse reinforcing ribs 632 in a lattice pattern between guides 633. For example, the support portion 630 may include guides 633 protruding so as to define an outer edge of the support portion 630, longitudinal reinforcing ribs 631 integrally formed with the guides 633 and configured to provide a plurality of ribs extending in the longitudinal direction, and transverse reinforcing ribs 632 configured to provide a plurality of ribs extending in the transverse direction.

The coupling portions 620 may have a truncated quadrangular pyramid shape and may protrude so that each of the coupling portions 620 grows narrower from the upper portion toward the lower portion thereof. The coupling portions 620 may be seated and stacked on the cover groove portions of the cover 400 to be described later or may be seated and stacked on the accommodation portions 610 of another palette 600. In this case, the inclination angle of the truncated quadrangular pyramid of the coupling portions 620 may be set to fall within a range between 75 to 85 degrees. This makes it possible to minimize external impact and to minimize damage through load distribution.

The accommodation portions 610 may be formed in a truncated quadrangular pyramidal groove shape in the upper portion of the support portion 630. When only the palettes 600 are stored in a stacked state by dismantling the assembly boxes for transportation, the coupling portions 620 of another palette 600 may be inserted into and stacked on the accommodation portions 610.

Figure 16:
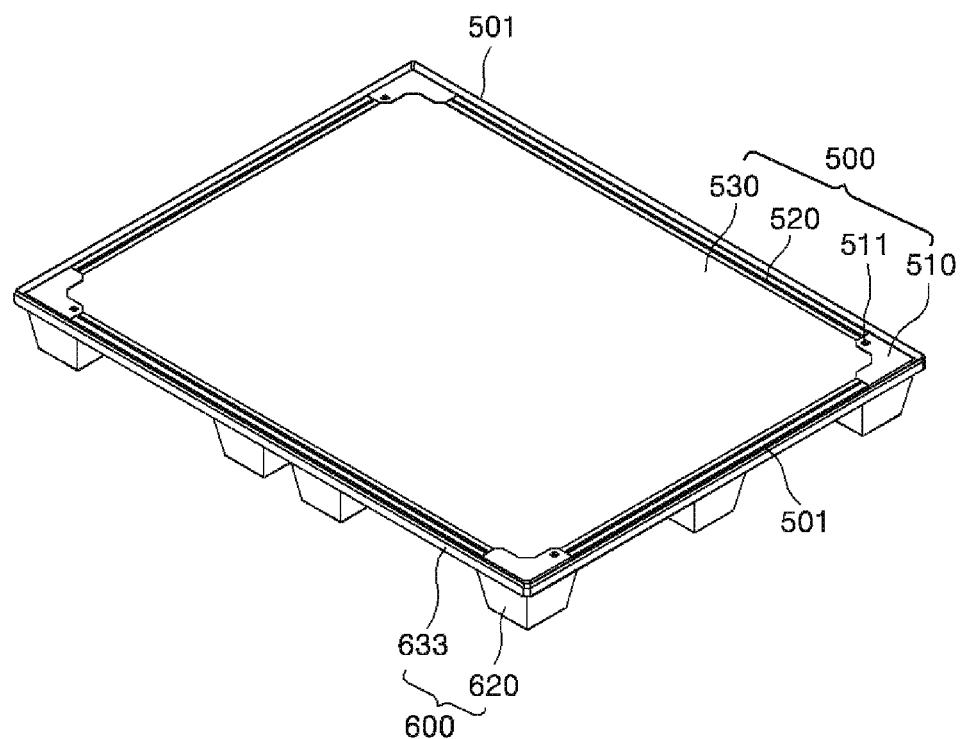
FIG. 16 is a perspective view illustrating a combined state of a base and a palette according to one embodiment of the present invention.

FIG. 16 is a perspective view illustrating a combined state of the base and the palette according to one embodiment of the present invention.

As illustrated in FIG. 16, the base 500 may include a base plate 530 configured to provide a bottom surface of the main body 100, base frames 520 configured to define an edge of the base plate 530, and base brackets 510 configured to interconnect the base frames 520, each of the base brackets 510 including a seating groove 511 and a seating projection (not shown) formed on the upper and lower surfaces thereof.

The base 500 may be seated on the palette 600. In this case, an assembly groove 201, into which the main body 100 is inserted, may be formed between the guides 633 of the palette 600 and the edge portion of the base 500.

The assembly groove 201 is a gap formed between the palette 600 and the base 500 when the palette 600 and the base 500 are coupled to each other. The gap may provide a spaced-apart distance just as much as the thickness of the sidewall of the main body 100. Thus, when assembling the assembly box for transportation, the assembly groove 201 may serve to stably hold the main body 100.

Figure 17:
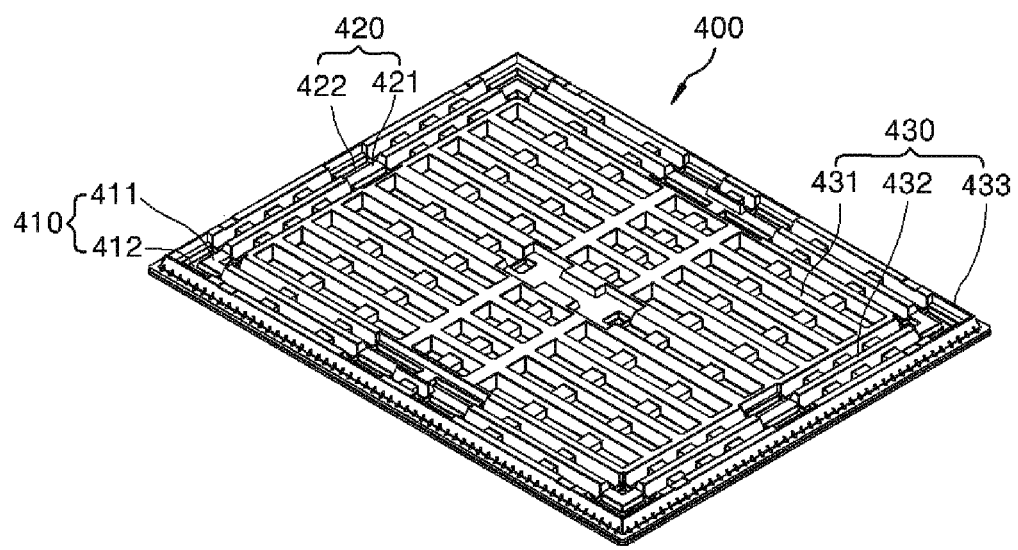
FIG. 17 is an enlarged perspective view of a cover according to one embodiment of the present invention.

FIG. 17 is an enlarged perspective view of the cover 400 according to one embodiment of the present invention.

As illustrated in FIG. 17, the cover 400 may include a cover portion 430 and cover groove portions and may serve to cover and protect the upper portion of the assembly box for transportation.

The cover portion 430 may be generally formed in such a shape that the palette 600 can be stacked with ease. The cover portion 430 may be formed so that longitudinal reinforcing ribs 431 and transverse reinforcing ribs 432 intersect each other between guides 433 which define an outer edge of the cover portion 430. Since the longitudinal reinforcing ribs 431 and the transverse reinforcing ribs 432 are connected in a lattice shape, it is possible to prevent the cover portion 430 from being bent by an external impact and to minimize shocks through load distribution. The cover groove portions may be formed in the edge and the center of the cover portion 430.

The cover groove portions may be formed in the upper portion of the cover portion 430 in a depressed shape so that the coupling portions 620 of the palette 600 can be seated on the cover groove portions. The cover groove portions may include corner cover groove portions 410 positioned at the corners of the palette 600 and edge cover groove portions 420 positioned at the edge of the palette 600. Each of the corner cover groove portions 410 may provide a bent corner rib 411 and a corner rib groove 412. Each of the edge cover groove portions 420 may provide a straight edge rib 421 and a straight edge rib groove 422.

Hereinafter, descriptions will be made on a method folding and stacking the assembly box according to one embodiment of the present invention.

Figure 18:
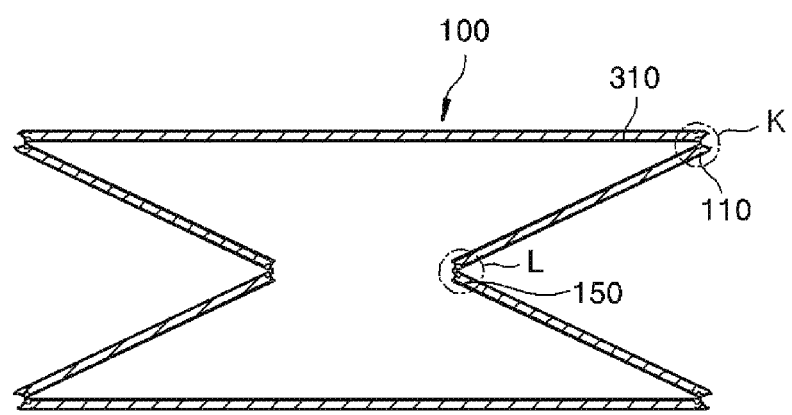
FIG. 18 is a view illustrating a folded state of sidewalls of the assembly box for transportation according to one embodiment of the present invention.
Figure 19:
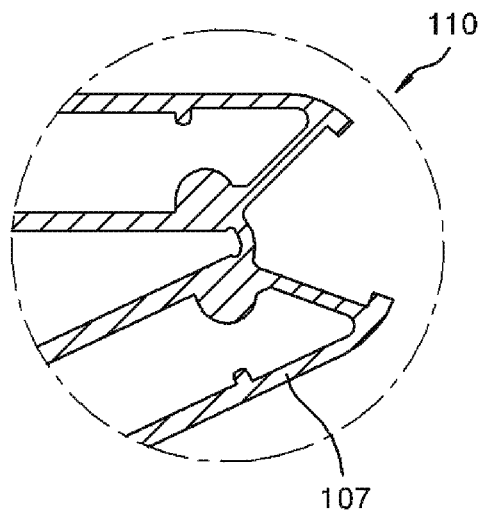
FIG. 19 is an enlarged view of a portion indicated by "K" in FIG. 18.
Figure 20:
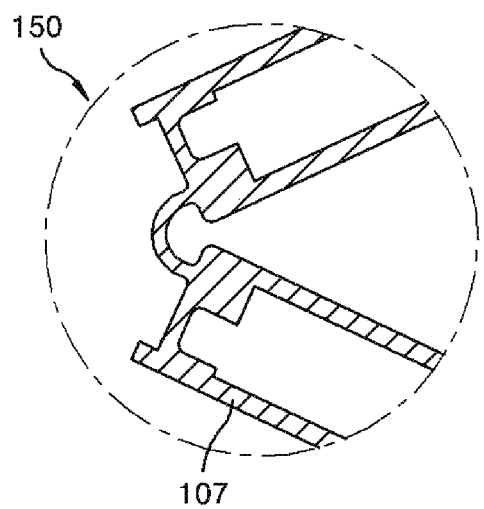
FIG. 20 is an enlarged view of a portion indicated by "L" in FIG. 18.

FIG. 18 is a view illustrating a folded state of the sidewalls of the assembly box for transportation according to one embodiment of the present invention. FIG. 19 is an enlarged view of a portion indicated by "K" in FIG. 18. FIG. 20 is an enlarged view of a portion indicated by "L" in FIG. 18.

As illustrated in FIGS. 18 to 20, the main body 100 of the assembly box may be folded using the vertical folding frames 150 and the vertical corner frames 110.

Specifically, if the sidewalls 310 positioned in the transverse direction are folded inward of the main body 100 about the hinge members 107 of the vertical folding frames 150, the hinge members 107 of the vertical corner frames 110 are folded outward of the main body 100. Thus, the sidewalls 310 positioned in the longitudinal direction may be overlapped with each other.

Figure 21:
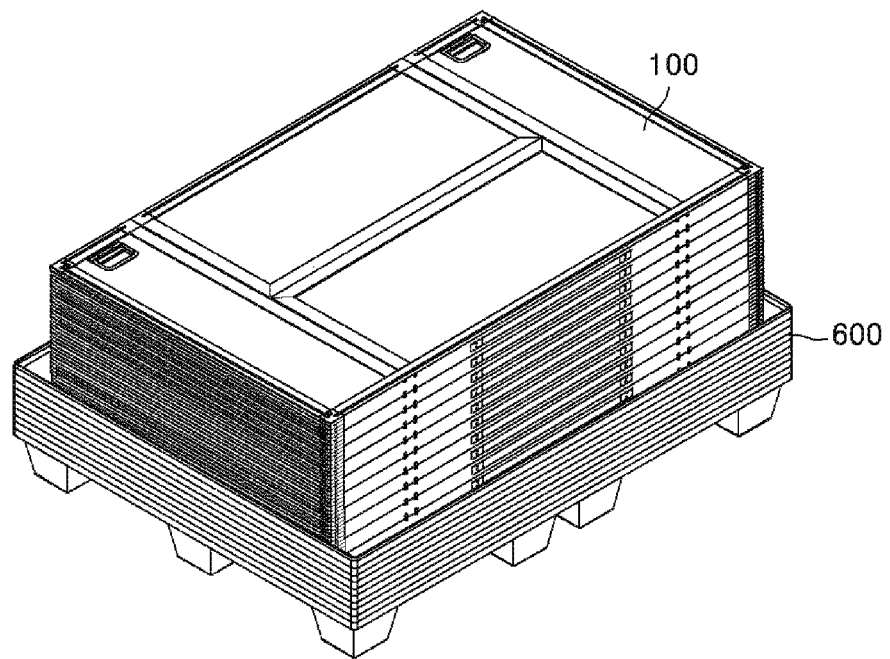
FIG. 21 is a view illustrating a state in which multiple sidewalls of the assembly box for transportation according to one embodiment of the present invention are folded and stacked on a palette.
Figure 22:
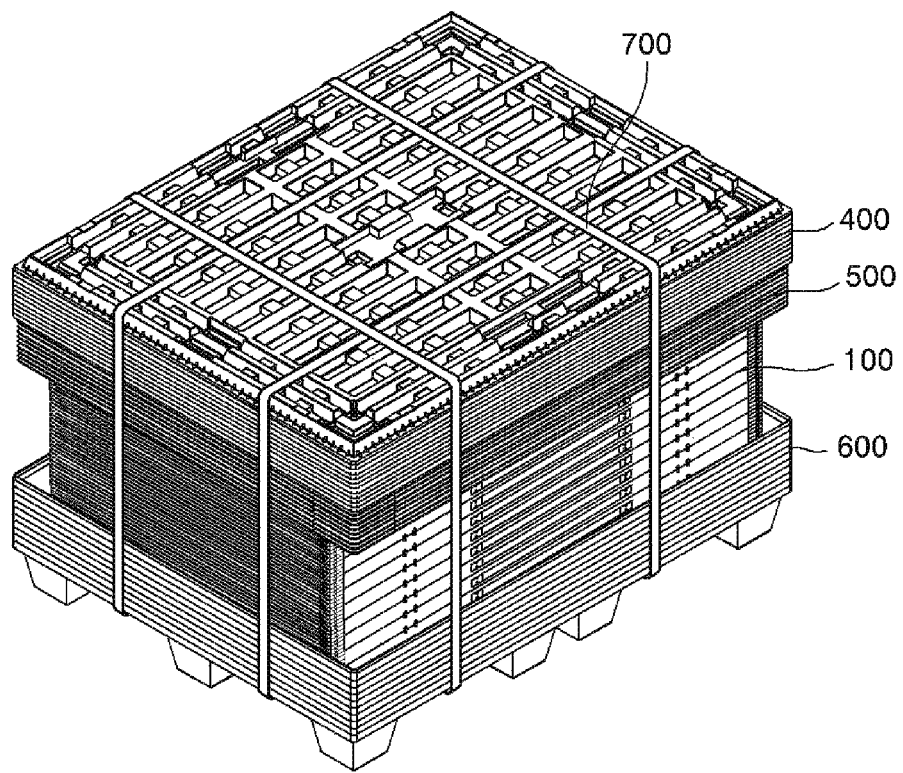
FIG. 22 is a view illustrating a state in which multiple assembly boxes for transportation according to one embodiment of the present invention are stacked.
Figure 23:
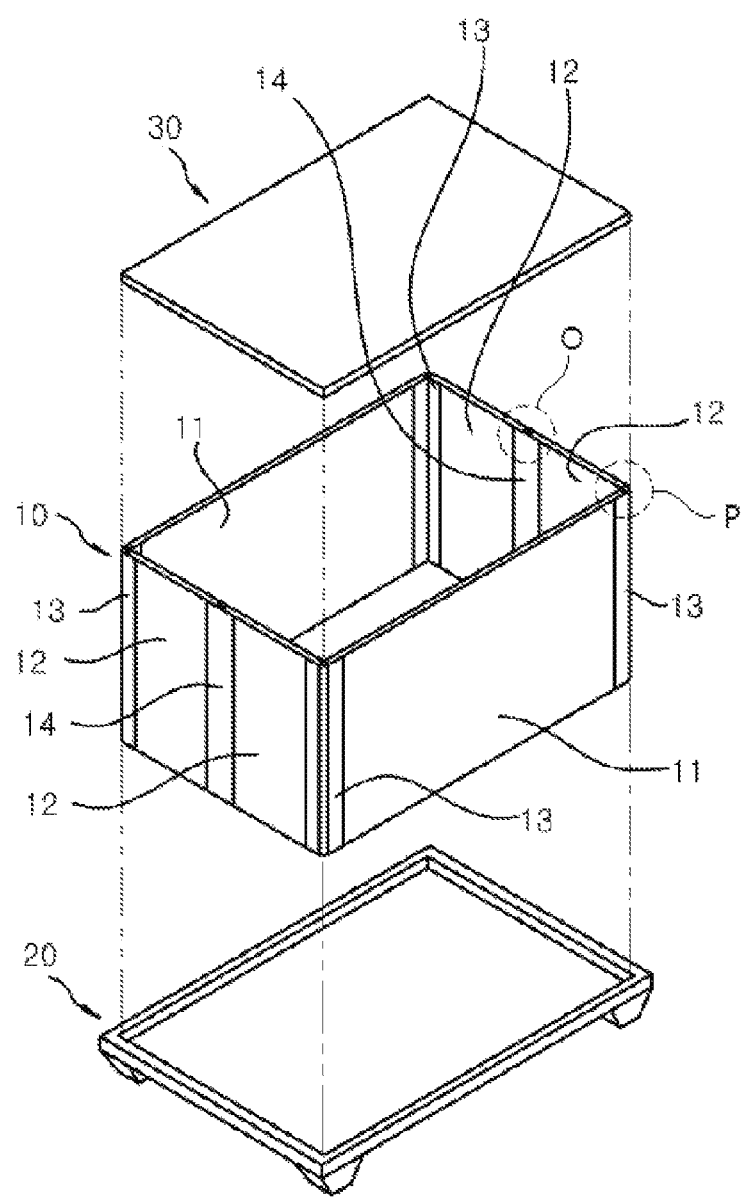
FIG. 23 is an exploded perspective view illustrating a foldable assembly box for transportation according to the related art.
Figure 24:
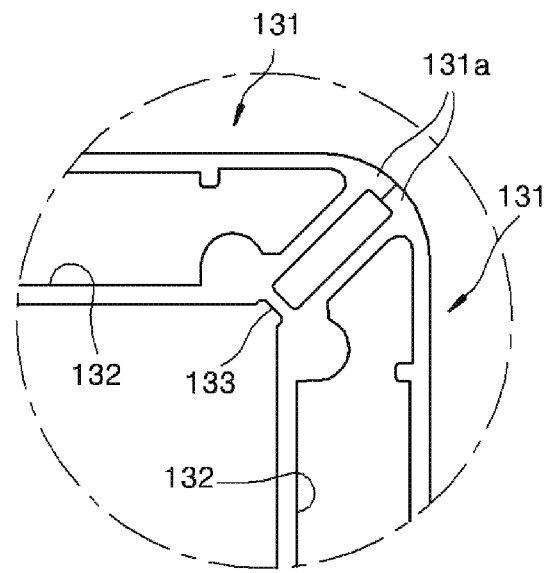
FIG. 24 is an enlarged view of a portion indicated by "O" in FIG. 23.
Figure 25:
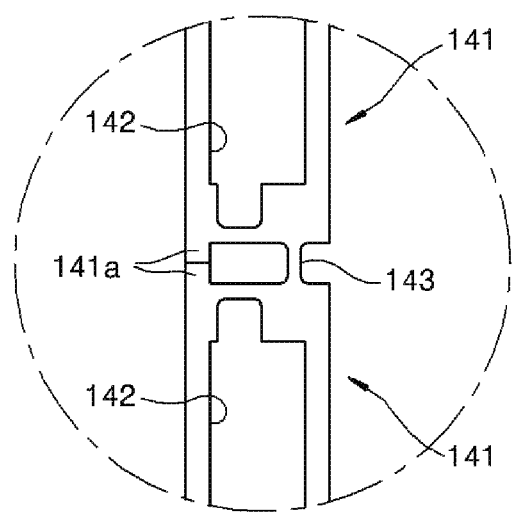
FIG. 25 is an enlarged view of a portion indicated by "P" in FIG. 23.

FIG. 21 is a view illustrating a state in which the multiple sidewalls of the assembly box for transportation according to one embodiment of the present invention are folded and stacked on the palette. FIG. 22 is a view illustrating a state in which the multiple assembly boxes for transportation according to one embodiment of the present invention are stacked.

As illustrated in FIGS. 21 and 22, when recovering or storing the assembly box, the components of the assembly box, for example, the palette 600, the base 500, the main body 100 and the cover 400, may be stacked in a mutually-overlapping state and may be bound by a band 700.

In the present embodiment, the components obtained by dismantling ten assembly boxes are stacked ten by ten and are bound by the band 700. For example, ten palettes 600 are stacked in a mutually-overlapping state. Then, ten bases 500 are stacked in a mutually-overlapping state and are placed on the stacked palettes 600. At this time, the ten bases 500 may be fixed to one another using the searing grooves 511 and the seating projections.

After the bases 500 are placed on the palettes 600, ten folded main bodies 100 are stacked on the bases 500 in a mutually-overlapping state. At this time, the seating grooves 511 of the uppermost one of the ten bases 500 and the fixing projections 204 of the corner brackets 210 of the lowermost one of the main bodies 100 may be fixed to each other. The ten main bodies 100 may be fixed to one other using the fixing projections 204 and the fixing roves 203 of the corner brackets 210.

After the main bodies 100 are stacked on the bases 500, ten covers 400 are stacked on the main bodies 100 in a mutually-overlapping state. After the components of the assembly boxes (e.g., the palettes 600, the bases 500, the main bodies 100 and the covers 400) are sequentially stacked in this way, the components of the assembly boxes are bound in a lattice pattern using the band 700 and are transported or stored in a warehouse.

As described above, the embodiments of the present invention have an advantage in that, by providing the corner brackets in the corner portions, it is possible to prevent damage such as rupture or the like of the corner portions. Furthermore, the embodiments of the present invention have an advantage in that it is possible to prevent distortion of the assembly box during an assembly process and to provide a stable framework through the use of a structure in which the brackets are fitted between the frames. Furthermore, the embodiments of the present invention have an advantage in that, by installing an RFID chip, which provides product information, in the handle of the assembly box, it is possible to easily perform a tracking management of the assembly box and a first-in and first-out management of the assembly box according to an incoming date. Furthermore, the embodiments of the present invention have an advantage in that, by removably installing the mark plate in the sidewall of the assembly box, it is possible to easily replace the information on the goods accommodated within the assembly box and to remove the mark plate during the cleaning process of the assembly box, thereby preventing damage and contamination of the mark plate.

What is claimed is:

1. An assembly box for transportation, comprising:
vertical corner frames disposed in corner portions;
first horizontal frames and second horizontal frames configured to define upper and lower edge portions of sidewalls and disposed in an orthogonal relationship with the vertical corner frames interposed between the first horizontal frames and the second horizontal frames; and
corner brackets configured to interconnect upper and lower ends of the vertical corner frames and end portions of the first horizontal frames and the second horizontal frames;
wherein each of the corner brackets includes:
a first bracket piece coupled to end portions of each of the vertical corner frames and each of the first horizontal frames and provided with a first rail groove formed in one side portion thereof;
a second bracket piece coupled to end portions of each of the vertical corner frames and each of the second horizontal frames and provided with a second rail groove formed in one side portion thereof;
a first guide fitted to the first rail groove at one end thereof and provided with a female rail at the other end thereof; and
a second guide fitted to the second rail groove at one end thereof and provided with a male rail at the other end thereof, the male rail slidingly fitted to the female rail.

2. The assembly box of claim 1, further comprising:
a cover configured to cover upper end portions of the vertical corner frames, the first horizontal frames and the second horizontal frames;
a palette fitted and coupled to lower end portions of the vertical corner frames, the first horizontal frames and the second horizontal frames; and
a base disposed on the palette and provided with base brackets in the corner portions.

3. The assembly box of claim 2, wherein the cover includes:
a cover portion in which longitudinal reinforcing ribs and transverse reinforcing ribs are formed to intersect each other between guides which define an outer edge of the cover; and
cover groove portions formed on the cover portion in a depressed shape.

4. The assembly box of claim 2, wherein the palette includes:
a support portion including guides protruding so as to define an outer edge of the support portion, longitudinal reinforcing ribs integrally formed with the guides and configured to provide a plurality of ribs extending in a longitudinal direction, and transverse reinforcing ribs configured to provide a plurality of ribs extending in a transverse direction;
coupling portions configured to protrude downward from the support portion; and
accommodation portions formed in an upper portion of the support portion in a depressed shape.

5. The assembly box of claim 1, wherein seating grooves configured to fix other stacked brackets are formed on upper and lower surfaces of the corner brackets.

6. The assembly box of claim 1, wherein fixing grooves and fixing projections configured to fix other stacked brackets are formed in the first bracket piece and the second bracket piece.

7. The assembly box of claim 1, further comprising:
a handle installed in the sidewalls,
wherein the handle includes a grip portion configured to be held by a user and an RFID chip configured to provide product information.

8. An assembly box for transportation, comprising:
vertical corner frames disposed in corner portions;
first horizontal frames and second horizontal frames configured to define upper and lower edge portions of sidewalls and disposed in an orthogonal relationship with the vertical corner frames interposed between the first horizontal frames and the second horizontal frames;
corner brackets configured to interconnect upper and lower ends of the vertical corner frames and end portions of the first horizontal frames and the second horizontal frames;
first vertical reinforcing frames and second vertical reinforcing frames disposed on mutually-facing sidewalls in a spaced-apart relationship; and
reinforcing brackets configured to connect the first vertical reinforcing frames and the second vertical reinforcing frames to the first horizontal frames.

9. The assembly box of claim 8, further comprising:
first vertical rail frames and second vertical rail frames slidably installed in the first vertical reinforcing frames and the second vertical reinforcing frames, respectively; and
horizontal reinforcing frames configured to orthogonally interconnect the first vertical rail frames and the second vertical rail frames.

10. The assembly box of claim 8, wherein each of the first vertical reinforcing frames and the second vertical reinforcing frames includes:
a first rail member provided at one end with a first insertion channel portion into which a neighboring sidewall is inserted, provided at the other end with a female rail portion, and provided at a center with a first fastening groove portion to which a screw is fastened; and
a second rail member provided at one end with a male rail portion to which the female rail portion is slidingly fitted, provided at the other end with a second insertion channel portion into which a neighboring sidewall is inserted, and provided at the center with a second fastening groove portion to which a screw is fastened.

11. An assembly box for transportation, comprising:
vertical corner frames disposed in corner portions;
first horizontal frames and second horizontal frames configured to define upper and lower edge portions of sidewalls and disposed in an orthogonal relationship with the vertical corner frames interposed between the first horizontal frames and the second horizontal frames;
corner brackets configured to interconnect upper and lower ends of the vertical corner frames and end portions of the first horizontal frames and the second horizontal frames;
vertical folding frames installed on mutually-facing sidewalls so that the sidewalls can be folded; and
folding brackets configured to connect the vertical folding frames to the second horizontal frames.

12. An assembly box for transportation, comprising:
vertical corner frames disposed in corner portions;
first horizontal frames and second horizontal frames configured to define upper and lower edge portions of sidewalls and disposed in an orthogonal relationship with the vertical corner frames interposed between the first horizontal frames and the second horizontal frames;
corner brackets configured to interconnect upper and lower ends of the vertical corner frames and end portions of the first horizontal frames and the second horizontal frames;
a mark plate mounted to the sidewalls through a removable mounting portion,
wherein the removable mounting portion includes:
a magnetic piece including asymmetrical engagement claws provided in opposite side portions of the magnetic piece so that the magnetic piece is fixed in a mounting hole of the sidewalls; and
an iron band provided in the mark plate so that the iron band is removably mounted to the magnetic piece.

* * * * *